H. J. MARX.
WINDING MACHINE.
APPLICATION FILED JAN. 24, 1911.
1,029,761.
Patented June 18, 1912.
2 SHEETS—SHEET 1.
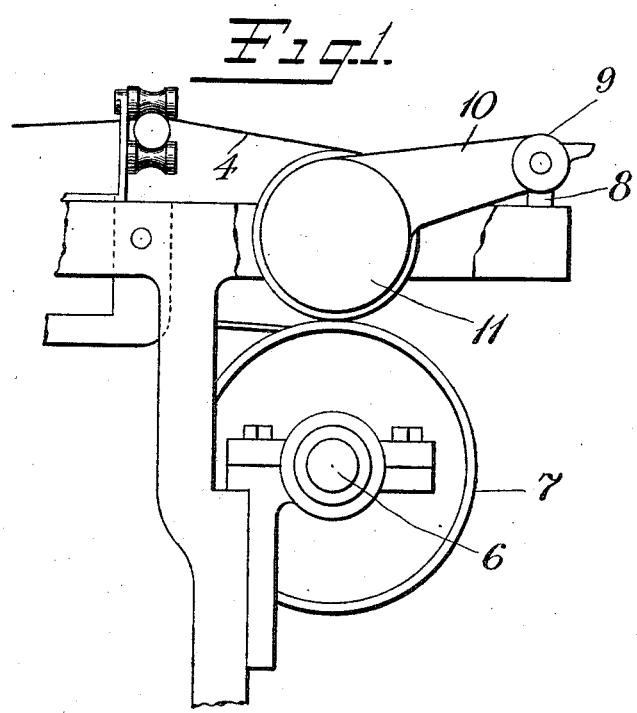
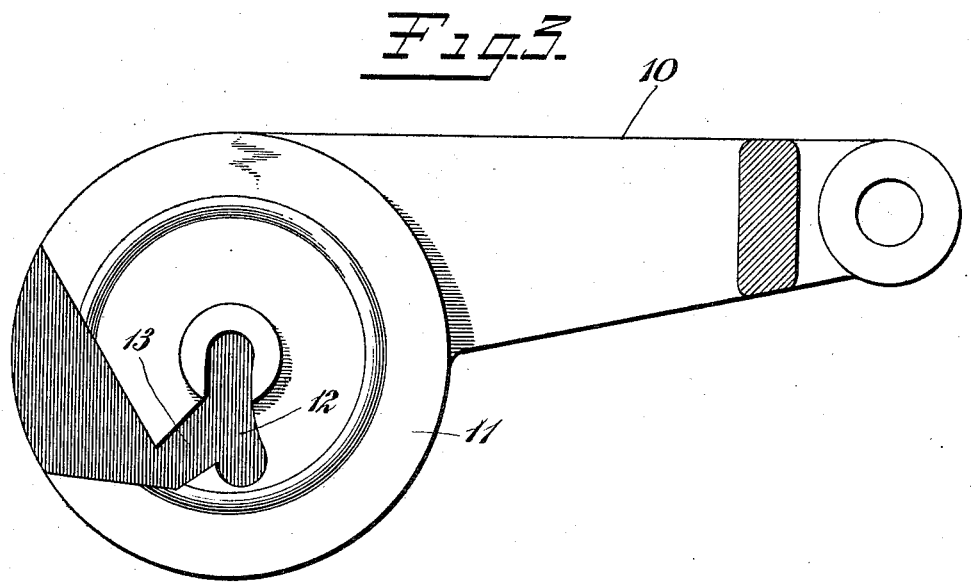
Witnesses:
Fred K. M. Dannenfelser
Chas. W. Pearl
Inventor
HENRY J. MARX
By his Attorneys
Bartlett, Maxwell & Mitchell

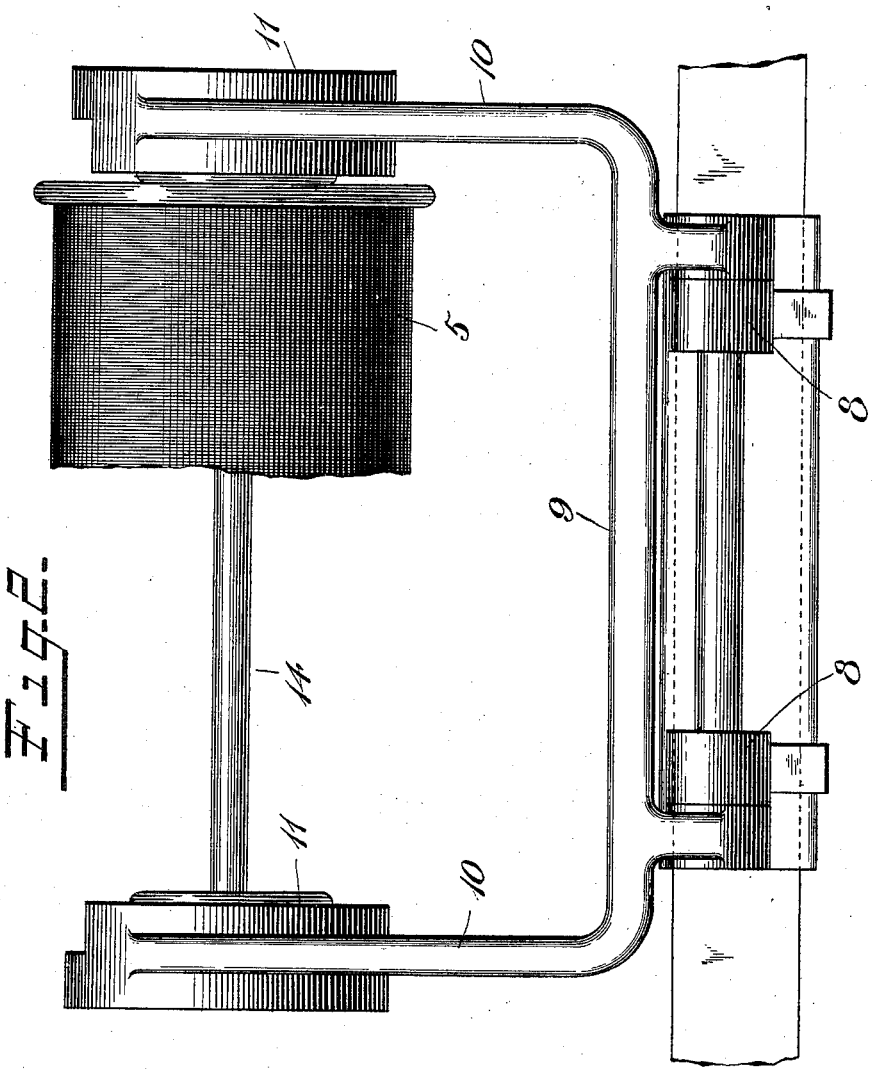

UNITED STATES PATENT OFFICE.

HENRY J. MARX, OF HOLYOKE, MASSACHUSETTS, ASSIGNOR TO THE AMERICAN THREAD COMPANY, OF NEW YORK, N. Y., A CORPORATION OF NEW JERSEY.

WINDING-MACHINE.

1,029,761.  Specification of Letters Patent.  Patented June 18, 1912.

Original application filed October 10, 1910, Serial No. 586,169. Divided and this applicaton filed January 24, 1911. Serial No. 604,324.

*To all whom it may concern:*

Be it known that I, HENRY J. MARX, a citizen of the United States, residing at Holyoke, Hampden county, Massachusetts, have invented certain new and useful Improvements in Winding-Machines, of which the following is a full, clear, and exact description.

My invention relates to improvements in winding machines, and has for its object to provide an improved spool holder for horizontal drum driven spools into which the spool can be easily inserted, but from which it is not liable to be thrown or dropped out.

The following is a description of an embodiment of my invention, reference being had to the accompanying drawings, in which—

Figure 1 shows an end view of the spool holder with coöperating parts. Fig. 2 shows a plan view of the spool holder and the support to which it is pivoted. Fig. 3 shows a view of the inner side of one of the two similar arms and heads of the spool holder, the yoke being shown in section.

Referring more particularly to the drawings, 6 is a shaft journaled in the frame of the machine and carrying a drum 7, driven at a high, and, preferably, constant speed. Pivoted to suitable projections 8 above and in front of the drum is a spool holder 9, consisting of two arms 10, connected by a yoke, and having two heads 11 each provided with an elongated recess 12, upwardly extending when the holder is in normal position, from each of which a channel 13 extends to the periphery of the corresponding head 11. These channels 13 enter the recesses 12 above the lower ends thereof and preferably midway between their ends so as to leave a pocket in each end of the recesses 12. When the holder is in normal position, the channels 13 near the recesses 12 slant downwardly therefrom at an angle oblique to the axes of said recesses, and then upwardly toward the peripheries of said heads, as shown in Fig. 3, so that the lowermost point of the upper wall of the channel 13 is approximately in line with the uppermost point of the other wall thereof, namely, the point where the lower wall meets with the wall of the elongated recess.

14 is a rod passing through the spool 5, the ends of which can be passed through the channels 13 into the recesses 12 in which recesses they will be held thus holding the spool between the two holder heads 11. As the bobbin holder 9 is raised or lowered, the rod 14 will drop from one to the other of the pockets of the recesses 12, passing the channels 13 without falling out. If, however, it is desired to remove the spool, this can be easily done by lifting the bobbin holder 9 so as to invert it, and then manually moving the spool so that the rod 14 will follow into the channels 13. The bobbin holder 9, when in operative or normal position, is held by the weight of its heads 11 in such a position that the bobbin rests upon the drum 7, the weight of the heads holding the spool against the drum 7 so as to give it an intimate driving contact therewith, for winding the thread 4.

The angle of the lower walls of the channels 13 near the peripheries of the heads prevents the rod 14 from dropping out if it should, by chance, pass into the channels 13, as the spool holder is being lowered, and holds it in such a position that when the bobbin bears against the drum 7, it will be forced to enter the upper pockets in the recesses 12 by the upper wall of the channel 13. The expansion of the channel at the periphery assists in the easy insertion of the rod 14.

The particular form of channel shown is the form preferred by me, but the same may be somewhat modified without departing from the spirit of my invention, or the scope of the claims appended hereto, as will be obvious to those skilled in the art.

This application is a division of my application Serial No. 586,169, filed October 10th, 1910.

What I claim is:

1. In a machine of the character described, the combination of a horizontal drum, a spool holder pivoted adjacent thereto, said spool holder having two opposing heads, each head having an elongated recess upwardly extending when said holder is in normal position, channels extending from the peripheries of said heads and connected with their said recesses at points above the lower ends thereof, and a removable rod having its ends within said recesses, said channels entering said recesses obliquely and slanting downward near said recesses when said holder is in normal position.

2. In a machine of the character described, the combination of a horizontal drum, a spool holder pivoted adjacent thereto, said spool holder having two opposing heads, each head having an elongated recess upwardly extending when said holder is in normal position, channels extending from the peripheries of said heads and connected with their said recesses at points above the lower ends thereof, and a rod having its ends within said recesses, said channels when said holder is in normal position extending in a downwardly slanting direction adjacent to said recesses, and extending upwardly toward said peripheries, the lowest point of the upper wall of said channel being approximately in line with the point where the lowest wall thereof meets the wall of said elongated recess.

3. In a machine of the character described, the combination of a horizontal drum, a spool holder pivoted adjacent thereto, said spool holder having two opposing heads, each head having an elongated recess upwardly extending when said holder is in normal position, channels extending from the peripheries of said heads and connected with their said recesses at points between the ends of said recesses, and a removable rod having its ends within said recesses, said channels entering said recesses obliquely and slanting downward near said recesses when said holder is in normal position, the lowest point of the upper wall of said channel being approximately in line with the point where the lowest wall thereof meets the wall of said elongated recess.

HENRY J. MARX.

Witnesses:
ROBT. K. CLARK,
J. L. BUGBEE.

---

Copies of this patent may be obtained for five cents each, by addressing the "Commissioner of Patents, Washington, D. C."